(12) United States Patent
Trivedi et al.

(10) Patent No.: US 12,152,172 B2
(45) Date of Patent: Nov. 26, 2024

(54) ONE COMPONENT (1K) ANAEROBIC CURABLE COMPOSITION

(71) Applicant: Henkel AG & Co. KGaA, Duesseldorf (DE)

(72) Inventors: Krunal Trivedi, Vapi (IN); Namdev Ghule, Navi Mumbai (IN); Jayesh P. Shah, Pune (IN); Prasad Khandagale, Pune Maharashtra (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 171 days.

(21) Appl. No.: 17/747,459

(22) Filed: May 18, 2022

(65) Prior Publication Data

US 2022/0275259 A1 Sep. 1, 2022

Related U.S. Application Data

(63) Continuation of application No. PCT/EP2020/080902, filed on Nov. 4, 2020.

(30) Foreign Application Priority Data

Nov. 18, 2019 (IN) .............................. 201941046835

(51) Int. Cl.
*C09J 133/10* (2006.01)
*C09J 11/04* (2006.01)
*C09J 101/14* (2006.01)

(52) U.S. Cl.
CPC ............. *C09J 133/10* (2013.01); *C09J 11/04* (2013.01); *C09J 101/14* (2013.01)

(58) Field of Classification Search
CPC ........ C09J 133/10; C09J 11/04; C08F 251/02; C08L 51/02; C09D 4/06; C08K 3/36
USPC ....................................................... 156/336
See application file for complete search history.

(56) References Cited

U.S. PATENT DOCUMENTS 3,980,627 A 9/1976 Mcdowell et al.
4,812,495 A 3/1989 Sand
6,596,808 B1 7/2003 Newberth, III et al.
8,003,715 B2 8/2011 Shelton et al.
8,034,851 B1 * 10/2011 Klemarczyk ............ C09K 3/10
526/204
2006/0047046 A1 3/2006 Haas
2009/0281335 A1 11/2009 Glaser et al.
2011/0290418 A1 12/2011 Klemarczyk et al.

FOREIGN PATENT DOCUMENTS

WO 2019122042 A1 6/2019

OTHER PUBLICATIONS

PCT International Search Report in connection with International Application No. PCT/EP2020/080902—Mailed Feb. 12, 2021.

* cited by examiner

*Primary Examiner* — James D Sells
(74) *Attorney, Agent, or Firm* — Steven C. Bauman

(57) ABSTRACT

The present invention provides an one-component (1K) anaerobic curable composition comprising, based on the weight of the composition:

from 15 to 35 wt. % of a1) at least one (meth)acrylate monomer represented by Formula I:

$$H_2C=CGCO_2R^1 \quad (I)$$

wherein: G is hydrogen, halogen or a $C_1$-$C_4$ alkyl group; and,
$R^1$ is selected from $C_1$-$C_{30}$ alkyl, $C_3$-$C_{30}$ cycloalkyl, $C_2$-$C_{20}$ alkenyl and $C_2$-$C_{12}$ alkynyl;

from 5 to 25 wt. % of a2) at least one (meth)acrylate monomer represented by Formula II:

$$H_2C=CQCO_2R^2 \quad (II)$$

wherein: Q may be hydrogen, halogen or a $C_1$-$C_4$ alkyl group; and,
$R^2$ may be selected from $C_6$-$C_{18}$ aryl, alkaryl and aralkyl;

from 35 to 75 wt. % of a3) at least one (meth)acrylate-functionalized oligomer;
from 0.1 to 10 wt. % of b) at least one cure initiator;
from 0.1 to 5 wt. % of c) at least one cure accelerator;
from 1 to 5 wt. % of d) at least one cellulose mixed ester of which all of said ester groups are selected from $C_1$-$C_6$ ester groups; and,
from 1 to 5 wt. % of e) fumed silica.

17 Claims, No Drawings

ONE COMPONENT (1K) ANAEROBIC CURABLE COMPOSITION

FIELD OF THE INVENTION

The present invention is directed to a one component (1K) anaerobic curable composition comprising a plurality of (meth)acrylate functional compounds, an anaerobic cure-inducing composition and, in combination, fumed silica and a cellulose mixed ester.

BACKGROUND OF THE INVENTION

Structural anaerobic adhesives have found utility in a plethora of applications of which the automotive industry is an important example. The curable monomers present in the anaerobic adhesive compositions are often tailored to provide the strength and toughness required for the application at hand. Moreover, the monomers and further components of the adhesive compositions are determinative of rate of cure, of the strength and of the chemical and thermal resistance of the cured products. And, as an instructive background reference to the formulation of such compositions, reference may be made to R. D. Rich, *Anaerobic Adhesives in Handbook of Adhesive Technology*, 29, 467-79, Marcel Dekker, Inc., New York (1994).

When a structural adhesive or sealant is applied to a substrate surface, any significant gravity-induced downward flow (sag) of the applied composition—whilst it cures—can obviously result in an uneven thickness. This problem has been moderated in the art by inter alia applying higher viscosity compositions and indeed this may not be deleterious either where the composition is required to fill gaps, cavities and imperfections of small dimensions on a substrate surface or where the composition is used to form a continuous surface-to-surface bond. However, high viscosity adhesive or sealant compositions may not be appropriate for structural applications where some directed flow or elongation within the assembly is necessary to form an operative bond.

US2006/0047046 (Haas) describes an anaerobic adhesive composition comprising: a monomer curable upon exclusion of oxygen, in particular an acrylate ester or vinyl ether; a peroxy polymerization initiator; and, a thixotrope imparting a thixotropic viscosity ratio in an uncured state of 8.2:1 to 11:1 as measured at rotation rates of 0.5 and 10 revolutions per minute. Based on the weight of the composition, the thixotrope may be constituted by either: from 3 to 50 wt. % of inorganic particulate; or, from 3 to 36 wt. % of an organic compound.

Certain authors have proposed the use of particular adhesion promoters to inhibit sagging during the development of the adhesive bond upon curing of the anaerobic composition.

U.S. Pat. No. 6,596,808 (Newberth III et al.) discloses an anaerobic adhesive composition, the reaction products of which demonstrate bond strengths of at least 75% of their 24 hour room temperature bond strength within the first hour of room temperature cure, said composition comprising: a) an anaerobically curable (meth)acrylate monomer; b) a cure system for said (meth)acrylate monomer; and, c) an adhesion promoter additive having the formula HO—[M]—R, wherein M comprises a metal or bimetal complex and R comprises a methacryl group.

There is considered to exist a need in the art to develop low viscosity, anaerobically curable compositions which do not exhibit significant sagging upon application.

STATEMENT OF THE INVENTION

In accordance with a first aspect of the present invention there is provided an one component (1K) composition comprising, based on the weight of the composition:
from 15 to 35 wt. %, preferably from 15 to 30 wt. %, of
a1) at least one (meth)acrylate monomer represented by Formula I:

$$H_2C=CGCO_2R^1 \qquad (I)$$ 

wherein: G is hydrogen, halogen or a $C_1$-$C_4$ alkyl group; and,
$R^1$ is selected from $C_1$-$C_{30}$ alkyl, $C_3$-$C_{30}$ cycloalkyl, $C_2$-$C_{20}$ alkenyl and $C_2$-$C_{12}$ alkynyl;
from 5 to 25 wt. %, preferably from 5 to 20 wt. %, of a2) at least one (meth)acrylate monomer represented by Formula II:

$$H_2C=CQCO_2R^2 \qquad (II)$$ 

wherein: Q may be hydrogen, halogen or a $C_1$-$C_4$ alkyl group; and,
$R^2$ may be selected from $C_6$-$C_{18}$ aryl, alkaryl and aralkyl; from 35 to 75 wt. %, preferably from 40 to 60 wt. %, of a3) at least one (meth)acrylate-functionalized oligomer;
from 0.1 to 10 wt. %, preferably from 0.1 to 5 wt. %, of b) at least one cure initiator;
from 0.1 to 5 wt. % of c) at least one cure accelerator;
from 1 to 5 wt. % of d) at least one cellulose mixed ester of which all of said ester groups are selected from $C_1$-$C_6$ ester groups; and,
from 1 to 5 wt. % of e) fumed silica.

Compositions in accordance with the present invention have been found to demonstrate propitious anti-sagging properties. The compositions should be formulated to be essentially free of solvent but retain a viscosity of from 3000 or from 5000 to 20000 mPa·s, as measured at 20° C. and 50% Relative Humidity (RH): even when applied to substrates at this viscosity, deleterious dripping of the composition from the substrate surface may not be observed. Without wishing to be bound by theory, it is considered that hydrogen bonding between the cellulose mixed ester and fumed silica additives contribute to these positive rheological effects.

In accordance with a preferred embodiment of the invention, all ester groups of said at least one cellulose mixed ester are selected from $C_1$-$C_4$ ester groups. Independently of or additional to that consideration, it is preferred that said at least one cellulose mixed ester has a glass transition temperature ($T_g$) of from 40° C. to 120° C., preferably from 60° C. to 120° C., as measured by differential scanning calorimetry (DSC).

The fumed silica of the present composition is desirably characterized by at least one of: i) an average particle size of from 1 to 10 microns; ii) a specific surface area of from 100 to 250 $m^2/g$; and, iii) a tap density of from 25 to 75 g/l. Independently of or additional to that consideration, it is preferred that the ratio by weight of fumed silica to said cellulose ester in the composition is in the range from 3:1 to 1:3, for example from 3:1 to 1:2 or from 2:1 to 1:2.

In accordance with a second aspect of the invention there is provided a cured product obtained from the one-component (1K) composition as defined herein above and in the appended claims.

The present invention also provides for the use of the cured product as defined herein above and in the appended claims as a structural adhesive. More particularly, the cured product may find utility as a structural adhesive for the bonding of metal-to-metal, metal-to-composite and composite-to-composite parts found in vehicular assemblies.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

Where used herein, the term "consisting essentially of" limits the scope of a claim to the specified element, ingredient, member or method step and those supplementary elements, ingredients, members or methods steps which do not materially affect the basic and novel characteristic(s) of the claimed invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0" specifically includes 0 wt. %: the ingredient defined by said range may or may not be present in the composition.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

As used herein, either alone or as part of another group, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be optionally interrupted. Independently or additionally, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy. In general a preference for alkyl groups containing from 1-18 carbon atoms ($C_1$-$C_{18}$ alkyl)—for example alkyl groups containing from 1 to 12 carbon atoms ($C_1$-$C_{12}$ alkyl) or from 1 to 6 carbon atoms ($C_1$-$C_6$ alkyl)—should be noted.

As specific examples of substituted alkyl groups there may be mentioned "$C_1$-$C_6$ hydroxyalkyl" groups by which is meant a $C_1$-$C_6$ alkyl group, as defined above, wherein at least one of the $C_1$-$C_6$ alkyl group's hydrogen atoms is replaced with an —OH group.

The term "$C_3$-$C_{30}$ cycloalkyl" is understood to mean a saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane. In the present invention, such cycloalkyl groups may be optionally interrupted. Independently or additionally, such cycloalkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=CH$_2$; —CH=CHCH$_3$; —CH$_2$CH=CH$_2$; —C(=CH$_2$)(CH$_3$); —CH=CHCH$_2$CH$_3$; —CH$_2$CH=CHCH$_3$; —CH$_2$CH$_2$CH=CH$_2$; —CH=C(CH$_3$)$_2$; —CH$_2$C(=CH$_2$) (CH$_3$); —C(=CH$_2$)CH$_2$CH$_3$; —C(CH$_3$)=CHCH$_3$; —C(CH$_3$)CH=CH$_2$; —CH=CHCH$_2$CH$_2$CH$_3$; —CH$_2$CH=CHCH$_2$CH$_3$; —CH$_2$CH$_2$CH=CHCH$_3$; —CH$_2$CH$_2$CH$_2$CH=CH$_2$; —C(=CH$_2$)CH$_2$CH$_2$CH$_3$; —C(CH$_3$)=CHCH$_2$CH$_3$; —CH(CH$_3$)CH=CHCH; —CH(CH$_3$)CH$_2$CH=CH$_2$; —CH$_2$CH=C(CH$_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl. In the present invention, such alkenyl groups may be optionally interrupted. Independently or additionally, such alkenyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

The term "$C_2$-$C_{12}$ alkynyl" as used herein refers to an unsaturated straight or branched hydrocarbon having from 2 to 12 carbon atoms and at least one carbon-carbon triple bond. The alkynyl group can be straight chained or branched and may optionally be substituted. Exemplary alkynyl groups include ethynyl, prop-1-yn-1-yl, and but-1-yn-1-yl. In the present invention, such alkynyl groups may be optionally interrupted. Independently or additionally, such alkenyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

As used herein, "alkylaryl" refers to alkyl-substituted aryl groups and "substituted alkylaryl" refers to alkylaryl groups further bearing one or more substituents as set forth above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

The phrase "optionally interrupted" as used herein refers to a group, as defined above, which is either uninterrupted or which is interrupted between adjacent carbon atoms by: oxygen (O); sulphur (S); or, the heterogroup N(R") wherein R" is H, $C_1$-$C_6$ alkyl or $C_6$-$C_{18}$ aryl.

As used herein, "(meth)acrylate" and like terms are intended to include both acrylate and methacrylate.

The term "cure accelerator" is intended herein to encompass any material which is a cure accelerator (or curing agent) for the (meth)acrylate functional compounds disclosed herein [a1)-a3)] and, if applicable, for other ethylenically unsaturated monomers present in the composition. The accelerator may be of either the catalytic or reactive type.

As is known in the art, "cellulose" is a readily available, naturally occurring polymer, comprising anhydroglucose units joined by an oxygen linkage to form long molecular chains. The term "modified cellulose" is applied to polymers formed by substitution of appropriate radicals for the hydroxyl groups on the cellulose backbone. Specifically herein the "cellulose ester" refers to a modified cellulose consisting of an α(1-4) sequence of partially or totally esterified anhydroglucose rings, the esterification being obtained via the reaction of free hydroxyl functions of said anhydroglucose rings with a linear or branched carboxylic acid or carboxylic acid derivative, such as an acid chloride or acid anhydride. Moreover, "cellulose mixed ester" references cellulose esters having more than one ester type.

Cellulose esters are generally prepared by first converting cellulose to a cellulose triester before hydrolyzing the cellulose triester in an acidic aqueous media to the desired degree of substitution (DS), by which term is meant the average number of substituents per anhydroglucose monomer unit as measured by potentiometric titration. An instructive reference for the synthesis of mixed or homogeneous cellulose ester polymer is: Mulzer et al. *Synthesis of Esters, Activated Esters and Lactones*, Section 2.2 in Trost and Fleming *Comprehensive Organic Synthesis*, Volume 6 (1991).

As used herein, the term "silica" refers to amorphous silicon dioxide ($SiO_2$). As used herein, the term "fumed silica" is synonymous with "pyrogenic silica" and refers to silicon dioxide formed in flame or in sufficiently high temperature to decompose organic materials.

The molecular weights referred to in this specification can be measured with gel permeation chromatography (GPC) using polystyrene calibration standards, such as is done according to ASTM 3536.

Viscosities of the coating compositions described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 mPa·s to 50,000 mPa·s. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

Where mentioned, a calculated glass transition temperature ("$T_g$") of a polymer or co-polymer is that temperature which may be calculated by using the Fox equation (T. G. Fox, Bull. Am. Physics Soc., Volume 1, Issue No. 3, page 123(1956)). The glass transition temperatures of certain homo-polymers may be found in the published literature, such as in "*Polymer Handbook*", edited by J. Brandrup and E. H. Immergut, Interscience Publishers.

The actual glass transition temperature ($T_g$) of a polymer can be determined by differential scanning calorimetry (DSC). The use of DSC to determine $T_g$ is well known in the art, and is described by B. Cassel and M. P. DiVito in "*Use of DSC To Obtain Accurate Thermodynamic and Kinetic Data*", American Laboratory, January 1994, pp 14-19, and by B. Wunderlich in Thermal Analysis, Academic Press, Inc., 1990. The glass transition temperatures ($T_g$) specifically measured in the current patent application have been measured according to the methodology of Deutsches Institut für Normung (DIN) 11357.

As used herein, "anhydrous" means the relevant composition includes less than 0.25% by weight of water. For example the composition may contain less than 0.1% by weight of water or be completely free of water. The term "essentially free of solvent" should be interpreted analogously as meaning the relevant composition comprises less than 0.25% by weight of solvent.

DETAILED DESCRIPTION OF THE INVENTION a1) Aliphatic and Cycloaliphatic (Meth)acrylate Monomers Based on the weight of the composition, the composition of the present invention necessarily comprises from 15 to 35 wt. %, preferably from 15 to 30 wt. %, of a1) at least one (meth)acrylate monomer represented by Formula I:

$$H_2C=CGCO_2R^1 \qquad (I)$$

wherein: G is hydrogen, halogen or a $C_1$-$C_4$ alkyl group; and, $R^1$ is selected from $C_1$-$C_{30}$ alkyl, $C_3$-$C_{30}$ cycloalkyl, $C_2$-$C_{20}$ alkenyl, and, $C_2$-$C_{12}$ alkynyl.

Desirably, said monomers) a1) are characterized in that $R^1$ is selected from $C_1$-$C_{18}$ alkyl and $C_3$-$C_{18}$ cycloalkyl. This statement of preference is expressly intended to include that embodiment wherein $R^1$ is $C_1$-$C_6$ hydroxylalkyl.

Examples of (meth)acrylate monomers a1) in accordance with Formula (I) include but are not limited to: methyl (meth)acrylate; ethyl (meth)acrylate; butyl (meth)acrylate; hexyl (meth)acrylate; 2-ethylhexyl (meth)acrylate; dodecyl (meth)acrylate; lauryl (meth)acrylate; cyclohexyl (meth) acrylate; isobornyl (meth)acrylate; 2-hydroxyethyl (meth)

acrylate (HEMA); 2-hydroxypropyl (meth)acrylate; ethylene glycol monomethyl ether (meth)acrylate; ethylene glycol monoethyl ether (meth)acrylate; ethylene glycol monododecyl ether (meth)acrylate; diethylene glycol monomethyl ether (meth)crylate; trifluoroethyl (meth)acrylate; and, perfluorooctyl (meth)acrylate.

a2) Aromatic (Meth)Acrylate Monomers

Based on the weight of the composition, the composition of the present invention necessarily comprises from 5 to 25 wt. %, preferably from 5 to 20 wt. %, of a2) at least one (meth)acrylate monomer represented by Formula II:

$$H_2C=CQCO_2R^2 \quad (II)$$

wherein: Q may be hydrogen, halogen or a $C_1$-$C_4$ alkyl group; and, $R^2$ may be selected from $C_6$-$C_{18}$ aryl, alkaryl and aralkyl.

Exemplary (meth)acrylate monomers a2) in accordance with Formula (II)—which may be used alone or in combination—include but are not limited to: benzyl (meth)acrylate; phenoxyethyl (meth)acrylate; phenoxydiethylene glycol (meth)acrylate; phenoxypropyl (meth)acrylate; and, phenoxydipropylene glycol (meth)acrylate.

a3) (Meth)Acrylate-Functionalized Oligomer

The compositions of the present invention comprise from 35 to 75 wt %, preferably from 40 to 60 wt. %, based on the weight of the composition, of a3) at least one (meth)acrylate-functionalized oligomer. Said oligomers may have one or more acrylate and/or methacrylate groups attached to the oligomeric backbone, which (meth)acrylate functional groups may be in a terminal position on the oligomer and/or may be distributed along the oligomeric backbone.

It is preferred that said at least one (meth)acrylate functionalized oligomers: i) have two or more (meth)acrylate functional groups per molecule; and/or, ii) have a weight average molecular weight (Mw) of from 300 to 1000 daltons.

Examples of such oligomers, which may be used alone or in combination, include but are not limited to: (meth)acrylate-functionalized urethane oligomers such as (meth)acrylate-functionalized polyester urethanes and (meth)acrylate-functionalized polyether urethanes; (meth)acrylate-functionalized polyepoxide resins; (meth)acrylate-functionalized polybutadienes; (meth)acrylic polyol (meth)acrylates; polyester (meth)acrylate oligomers; polyamide (meth)acrylate oligomers; and, polyether (meth)acrylate oligomers. Such (meth)acrylate-functionalized oligomers and their methods of preparation are disclosed in inter alia: U.S. Pat. Nos. 4,574,138; 4,439,600; 4,380,613; 4,309,526; 4,295,909; 4,018,851; 3,676,398; 3,770,602; 4,072,529; 4,511,732; 3,700,643; 4,133,723; 4,188,455; 4,206,025; 5,002,976.

In certain embodiments, component a3) may comprise or consist of at least one (meth)acrylate ester corresponding to Formula (III):

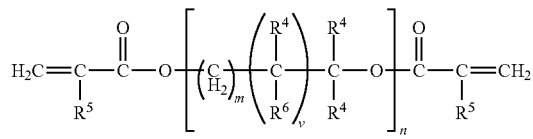

(III)

wherein: $R^4$ may be selected from hydrogen, $C_1$-$C_4$ alkyl and

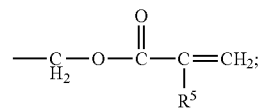

$R^5$ may be selected from hydrogen, halogen, and $C_1$-$C_4$ alkyl;

$R^6$ may be selected from hydrogen, hydroxy and

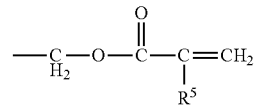

m is an integer ≥1, preferably from 1 to 8;

v is 0 or 1; and, n is an integer n is ≥3, preferably from 3 to 30.

Of such polyether (meth)acrylates of Formula III mention may in particular be made of poly(ethylene glycol) di(meth)acrylates possessing the structure below:

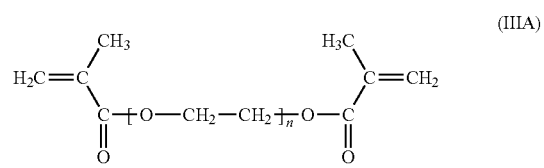

(IIIA)

wherein: n is ≤3, preferably from 3 to 30, more preferably from 3 to 20.

As such, specific examples include but are not limited to: PEG 200 DMA (n≈4); PEG 400 DMA (n≈9); PEG 600 DMA (n≈14); and, PEG 800 DMA (n≈19), in which the assigned number (e.g., 400) represents the weight average molecular weight of the glycol portion of the molecule.

The present invention does not preclude the presence of further ethylenically unsaturated monomers not conforming to the definitions of a1), a2) and a3). However, the addition of such further monomers should be constrained by the condition that the total amount of ethylenically unsaturated monomers should not exceed 95 wt. %, based on the total weight of the composition. Desirably, the total of ethylenically unsaturated monomers should not exceed 90 wt. %, based on the total weight of the composition.

Without intention to limit the present invention, such further ethylenically unsaturated monomers may include: silicone (meth)acrylate monomers, such as those taught by and claimed in U.S. Pat. No. 5,605,999 (Chu); α,β-ethylenically unsaturated monocarboxylic acids containing 3 to 5 carbon atoms such as acrylic acid, methacrylic acid, crotonic acid; $C_1$-$C_{18}$ alkyl esters of crotonic acid; α,β-ethylenically unsaturated dicarboxylic acids containing from 4 to 6 carbon atoms and the anhydrides, monoesters, and diesters of those acids; vinyl esters such as vinyl acetate and vinyl propionate; vinyl and vinylidene halides; vinyl ethers such as vinyl ethyl ether; vinyl ketones such as vinyl ethyl ketone; aromatic or heterocyclic aliphatic vinyl compounds; poly (meth)acrylates of alkane polyols, such as ethylene glycol di(meth)acrylate, propylene glycol di(meth)acrylate, butylene glycol di(meth)acrylate, neopentyl glycol di(meth)acrylate, hexylene glycol di(meth)acrylate, trimethylolpropane tri(meth)acrylate, glycerin tri(meth)acrylate, and pentaerythritol tetra(meth)acrylate; poly(meth)acrylates of oxyalkane polyols such as diethylene glycol di(meth)acrylate, dipropylene glycol di(meth)acrylate, triethylene glycol di(meth)acrylate, tetraethylene glycol di(meth)acrylate, dibutylene glycol di(meth)acrylate, di(pentamethylene glycol)dimethacrylate; polyethylene glycol di(meth)acrylates; and, bisphenol-A di(meth)acrylates, such as ethoxylated bisphenol-A (meth)acrylate ("EBIPMA").

Representative examples of other ethylenically unsaturated polymerizable monomers include, without limitation, fumaric, maleic, and itaconic anhydrides, monoesters and diesters with $C_1$-$C_4$ alcohols such as methanol, ethanol, propanol, isopropanol, butanol, isobutanol, and tert-butanol. Representative examples of vinyl monomers include, without limitation, such compounds as: vinyl acetate; vinyl propionate; vinyl ethers, such as vinyl ethyl ether; and, vinyl ethyl ketone. Representative examples of aromatic or heterocyclic aliphatic vinyl compounds include, without limitation, such compounds as styrene, α-methyl styrene, vinyl toluene, tert-butyl styrene and 2-vinyl pyrrolidone.

b) Initiator

The composition of the present invention includes at least one cure initiator. The composition should conventionally comprise from 0.1 to 10 wt. %, for example from 0.1 to 5 wt. %, of b) said at least one cure initiator, based on the total weight of the composition.

While certain peroxides—such as dialkyl peroxides—have been disclosed as useful initiators in inter alia U.S. Pat. No. 3,419,512 (Lees) and U.S. Pat. No. 3,479,246 (Stapleton) and indeed may have utility herein, hydroperoxides represent a preferred class of initiator for the present invention. Further, whilst hydrogen peroxide itself may be used, the most desirable polymerization initiators are the organic hydroperoxides. For completeness, included within the definition of hydroperoxides are materials such as organic peroxides or organic peresters which decompose or hydrolyze to form organic hydroperoxides in situ: examples of such peroxides and peresters are cyclohexyl and hydroxycyclohexyl peroxide and t-butyl perbenzoate, respectively.

In a preferred embodiment of the invention, the initiator comprises or consists of at least one hydroperoxide compound represented by the formula:

$$R^p OOH$$

wherein: $R^p$ is a hydrocarbon group containing up to 18 carbon atoms, and preferably wherein: $R^p$ is a $C_1$-$C_{12}$ alkyl, $C_6$-$C_{18}$ aryl or $C_6$-$C_{18}$ aralkyl group.

As exemplary initiators, which may be used alone or in combination, there may be mentioned: cumene hydroperoxide (CHP); para-menthane hydroperoxide; t-butyl hydroperoxide (TBH); t-butyl perbenzoate; t-amyl hydroperoxide; 1,2,3,4-tetramethylbutyl hydroperoxide; benzoyl peroxide; dibenzoyl peroxide; 1,3-bis(t-butylperoxyisopropyl) benzene; diacetyl peroxide; butyl 4,4-bis (t-butylperoxy) valerate; p-chlorobenzoyl peroxide; t-butyl cumyl peroxide; di-t-butyl peroxide; dicumyl peroxide; 2,5-dimethyl-2,5-di-t-butylperoxyhexane; 2,5-dimethyl-2,5-di-t-butyl-peroxyhex-3-yne; 4-methyl-2,2-di-t-butylperoxypentane.

c) Accelerator

The composition of the present invention includes at least one cure accelerator. The composition should conventionally comprise from 0.1 to 5 wt. %, for example from 0.1 to 3 wt. %, of said at least one cure accelerator, based on the total weight of the composition.

Without intention to limit the present invention, accelerators which may find utility herein, either alone or in combination, include: saccharin; toluidines, such as N,N-diethyl-p-toluidine (DE-p-T) and N,N-dimethyl-o-toluidine (DM-o-T); acetyl phenylhydrazine (APH); 3-carboxyacryloyl phenylhydrazine (CAPH); methyl-3-carboxyacryloyl phenylhydrazine (MCAPH); 3-carboxypropanoyl phenylhydrazine (CPPH); methylene-3-carboxypropanoyl phenylhydrazine (MCPPH); phenyl glycines and derivatives thereof, as disclosed in U.S. Pat. No. 6,897,277 (Klemarczyk); maleic acid; quinones, such as naphthaquinone and anthraquinone; thiocaprolactam; thioureas, in particular alkyl thioureas; and, sulfonimide and sulfonamides, as disclosed in U.S. Pat. No. 6,958,368 (Klemarczyk).

Further instructive references on suitable cure accelerators include: U.S. Pat. No. 3,218,305 (Krieble); U.S. Pat. No. 4,180,640 (Melody); U.S. Pat. No. 4,287,330 (Rich); U.S. Pat. No. 4,321,349 (Rich); U.S. Pat. No. 3,970,505 (Hauser); and, U.S. Pat. No. 6,835,762 (Klemarczyk).

d) Cellulose Ester

The compositions of the present invention comprise from 1 to 5 wt. %, based on the weight of the composition, of at least one cellulose mixed ester of which all of said ester groups are selected from $C_1$-$C_6$ ester groups and in particular from $C_1$-$C_4$ ester groups. Thus, exemplary cellulose mixed esters may be selected from: cellulose acetate formate; cellulose acetate propionate; and, cellulose acetate butyrate. A particular preference for cellulose acetate butyrate may be mentioned.

Independently of or additional to the above stated preference for the constituent ester groups, the cellulose mixed ester should have a glass transition temperature ($T_g$) of from 40 to 160° C., preferably from 80° C. to 160° C., as measured by differential scanning calorimetry (DSC).

Independently of or additional to the above stated preferences, the cellulose mixed ester should possess the following properties:

a residual hydroxyl functionality per anhydroglucose unit of from 0.1 to 0.5;

a viscosity of less than 10 poise, as measured in a mixed solution of acetone and ethyl alcohol (20% cellulose ester, 72% acetone, 8% ethyl alcohol) at 25° C.; and, a weight average molecular weight (Mw) of from 10000 to 50000.

Suitable commercially available cellulose mixed esters include: CAB-551-0.2, available from Eastman Chemical Company; Rotuba CAB B900 available from Rotuba Extruders, Inc; cellulose acetate butyrate (Mn≈12000 g/mol) available from Merck Catalog No. 419036.

e) Fumed Silica

The composition of the present invention comprises from 1 to 5 wt. %, based on the weight of the composition, of fumed silica. That noted, the ratio by weight of fumed silica to said cellulose ester in the composition should conventionally be in the range from 5:1 to 1:5. Effective control of the rheology of the formulations of the present invention has, in particular, been attained where the ratio by weight of fumed silica to cellulose ester is from 3:1 to 1:3, for example from 3:1 to 1:2.

The utilized fumed silica should be characterized by at least one of: i) an average particle size, as determined by dynamic light scattering, of less than 15 microns; ii) a specific surface area, as determined by Brunauer-Emmett-Teller (BET) of from 20 to 400 m²/g; and, iii) a tap density, as determined ASTM B527-15 *Standard Test Method for Tap Density of Metal Powders and Compounds* of from 20 to 100 g/l. More particularly, the fumed silica should be characterized by at least one of: i) an average particle size of from 1 to 10 microns; ii) a specific surface area of from 100 to 250 m²/g; and, iii) a tap density of from 25 to 75 g/l. And, for completeness, it is noted that these conditions i) to iii) are not mutually exclusive and the fumed silica may meet one, two or desirably three of said conditions.

f) Additives and Adjunct Ingredients

Said compositions obtained in the present invention will typically further comprise adjuvants and additives that can impart improved properties to these compositions. Included among such adjuvants and additives are: plasticizers; supplementary stabilizers including UV stabilizers; sequestrants; antioxidants; coupling agents; adhesion promoters; rheological adjuvants; fillers; toughening agents; reactive diluents; drying agents; fungicides; flame retardants; corrosion inhibitors; fluorescence markers; pigments; and/or, non-reactive diluents.

Such adjuvants and additives can be used in such combination and proportions as desired, provided they do not adversely affect the nature and essential properties of the composition. While exceptions may exist in some cases, these adjuvants and additives should not in toto comprise more than 50 wt. % of the total composition and preferably should not comprise more than 20 wt. % of the composition.

It is noted, in aside, that metal catalysts are generally undesirable additives in one-part anaerobic formulations and indeed the formulations may comprise sequestering agents to precipitate contaminating metals. As such it is preferred that the compositions of the present invention comprise sequestrants in an amount of from 0.001 to 2.0 wt. %, based on the weight of the composition. Ethylene diamine tetraacetic acid or salts thereof and 1-hydroxyethane 1,1-diphosphonic acid (etidronic acid) or salts thereof may be mentioned as exemplary sequestrants.

A "plasticize?" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched $C_4$-$C_{16}$ alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

As suitable adhesion promoters there may be mentioned: (meth)acrylic acid; Ebecryl 168, methacrylated acidic adhesion promoter commercially available from Radcure Corporation; Ebecryl 170, acrylated acidic adhesion promoter commercially available from Radcure Corporation; β-carboxyacrylate; Sartomer CN 704, acrylated polyester adhesion promoter available from Sartomer Corporation; and, CD9050, monofunctional acid ester CD 9052, available from Sartomer Corporation; CD 9052, trifunctional acid ester commercially available from Sartomer Corporation; 2-(methacryloyloxy)ethyl succinate (HEMA succinate); and, zinc diacrylate.

Those compositions of the present invention may optionally contain a toughening rubber which is desirably present in the form of a rubber-modified epoxy resin, in the form of core-shell particles or a combination thereof. The toughening rubber should have a glass transition temperature ($T_g$) of no greater than −25° C.: preferably at least a portion of the toughening rubber should have a glass transition temperature ($T_g$) of −40° C. or lower, more preferably −50° C. or lower and even more preferably −70° C. or lower.

Independently of the presence of the cellulose mixed ester and the fumed silica necessarily present in the composition, it is envisaged that the compositions according to the present invention can additionally contain fillers. Suitable here are, for example, chalk, lime powder, precipitated silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, polyethylene fibers, polyethylene powder and particulate polytetrafluroethylene can also be added.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 µm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 1 to 15 wt. %, and more preferably from 1 to 10 wt. %, based on the total weight of the composition. The desired viscosity of the curable composition will typically be determinative of the total amount of filler added, noting that the anaerobic curable compositions should possess a viscosity of from 3000 to 20000, preferably from 5,000 to 15000 mPas.

Where a need may exist to lower the viscosity of an adhesive or sealant composition according to the present invention for specific applications, this may be best effected by using reactive diluent(s). The presence of non-reactive diluents and solvents in the compositions of the present invention is not precluded as a means of moderating the viscosities thereof but it is not preferred. Indeed, the compositions of the present invention should be characterized by being essentially free of solvent.

Illustrative Embodiment of the One Component (1K) Composition

In an exemplary embodiment of the present invention, the one component (1K) composition comprises, based on the weight of the composition:

from 15 to 30 wt. % of a1) at least one (meth)acrylate monomer represented by Formula I:

wherein: G is hydrogen, halogen or a $C_1$-$C_4$ alkyl group; and, $R^1$ is selected from $C_1$-$C_{18}$ alkyl and $C_3$-$C_{18}$ cycloalkyl;
from 5 to 20 wt. % of a2) at least one (meth)acrylate monomer represented by Formula II:

wherein: Q may be hydrogen, halogen or a $C_1$-$C_4$ alkyl group; and,
$R^2$ may be selected from $C_6$-$C_{18}$ aryl, alkaryl and aralkyl;
from 40 to 60 wt. % of a3) at least one (meth)acrylate-functionalized oligomer,
wherein said at least one (meth)acrylate functionalized oligomer is selected from: (meth)acrylate-functionalized urethane oligomers; (meth)acrylate-functionalized polyepoxide resins; (meth)acrylate-functionalized polybutadienes; (meth)acrylic polyol (meth)acrylates; polyester (meth)acrylate oligomers; polyamide (meth)acrylate oligomers; and, polyether (meth)acrylate oligomers; and,
wherein said at least one (meth)acrylate functionalized oligomer is characterized by having: i) two or more (meth)acrylate functional groups per molecule; and, ii) a weight average molecular weight (Mw) of from 300 to 1000 daltons;
from 0.1 to 5 wt. % of b) at least one cure initiator;
from 0.1 to 5 wt. % of c) at least one cure accelerator;
from 1 to 5 wt. % of d) at least one cellulose mixed ester of which all of said ester groups are selected from $C_1$-$C_4$ ester groups, wherein said cellulose mixed ester has a glass transition temperature ($T_g$) of from 80° C. to 160° C., as measured by differential scanning calorimetry (DSC); and,
from 1 to 5 wt. % of e) fumed silica, subject to the caveat that the ratio by weight of fumed silica to said cellulose ester d) is in the range from 3:1 to 1:3,
wherein said composition is characterized in that it is essentially free from solvent and has a viscosity of from 3000 to 20000 mPa·s, as determined at 20° C. and 50% Relative Humidity (RH).

Methods and Applications

To form a composition, the above described parts are brought together and mixed. As is known in the art, to form one component (1K) curable compositions, the elements of the composition are brought together and homogeneously mixed under conditions which inhibit or prevent the reactive components from reacting: as would be readily comprehended by the skilled artisan, this might include mixing conditions which limit or prevent exposure to moisture or irradiation or which limit or prevent the activation of a constituent latent catalyst. As such, it will often be preferred that the curative elements are not mixed by hand but are instead mixed by machine—a static or dynamic mixer, for example—in pre-determined amounts under anhydrous conditions without intentional photo-irradiation.

In accordance with the broadest process aspects of the present invention, the above described compositions are applied to a substrate and then cured in situ. Prior to applying the compositions, it is often advisable to pre-treat the relevant surfaces to remove foreign matter there from: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

In some embodiments, the adhesion of the coating compositions of the present invention to the preferably pre-treated substrate may be facilitated by the application of a primer thereto. Indeed primer compositions may be necessary for to ensure the fixture and/or efficacious cure times of the adhesive compositions on inactive substrates such as plastics, ceramics, wood, stainless steel, zinc and cadmium. Whilst the skilled artisan will be able to select an appropriate primer, instructive references for the choice of primer include but are not limited to: U.S. Pat. Nos. 3,855,040; 4,731,146; 4,990,281; 5,811,473; GB 2502554; and, U.S. Pat. No. 6,852,193.

The compositions are then applied to the preferably pre-treated, optionally primed surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating, adhesive and sealant applications, it is recommended that the compositions be applied to a wet film thickness of from 10 to 500 µm. The application of thinner layers within this range is more economical and provides for a reduced likelihood of deleterious thick cured regions. However, great control must be exercised in applying thinner coatings or layers so as to avoid the formation of discontinuous cured films.

The curing of the compositions of the invention typically occurs at temperatures in the range of from −10° C. to 120° C., preferably from 0° C. to 100° C., and in particular from 20° C. to 100° C. The temperature that is suitable depends on the specific compounds present and the desired curing rate and can be determined in the individual case by the skilled artisan, using simple preliminary tests if necessary. Of course, curing at temperatures of from 10° C. to 35° C. or from 20° C. to 30° C. is especially advantageous as it obviates the requirement to substantially heat or cool the mixture from the usually prevailing ambient temperature. Where applicable, however, the temperature of the composition may be raised above the mixing temperature and/or the application temperature using conventional means including microwave induction.

The following examples are illustrative of the present invention and are not intended to limit the scope of the invention in any way.

Examples

The following compounds and materials are employed in the Examples:
HEMA: 2-hydroxyethyl methacrylate, available from TCI America.
SR 833 NS: Tricyclodecane dimethanol diacrylate, available from Sartomer Americas.

Sartomer SR 339: 2-phenoxyethyl acrylate, available from Sartomer Americas.

Sartomer SR 340: 2-phenoxyethyl methacrylate, available from Sartomer Americas.

PEG DMA 200: Polyethylene glycol dimethacrylate, Mw=200 (n=4), available from Polysciences Inc.

Flex III Bulk Aromatic Urethane acrylate.

Premix-1 (PM-1) 1,4 Naphthoquinone.

Premix-2 (PM-2) Ethylene diamine tetra acetic acid (EDTA) tetrasodium salt.

Premix-3 (PM-3) Hydroxy ethane diphosphonic acid, available from TCI America.

Premix-4 (PM-4) Mixture of PM-1 and PM-2 (Stabilizers)

Ebecryl 168: Methacrylate modified acidic adhesion promoting agent, available from Allnex Netherlands BV.

Premix-5 (PM-5) Methylacryloyloxyethyl succinate.

Solvent Red 24: 1-[[2-methyl-4-[(2-methylphenyl)diazenyl]phenyl]diazenyl]naphthalen-2-ol (CAS No. 85-83-6), bis(azo) class organic pigment available from Epsilon Pigments.

CAB-551-0.2: Cellulose Acetate Butyrate available from Eastman Chemical Company.

Aerosil R 200: Fumed silica, available from Evonik Industries.

One component compositions were prepared by mixing the ingredients in accordance with Table 1 herein below.

TABLE 1

| Raw materials | Types of materials | Comparative Example 1 (wt. %) | Example 1 (wt. %) | Example 2 (wt. %) |
|---|---|---|---|---|
| HEMA | Aliphatic monomer | 7.2 | 8.4 | 13.5 |
| SR 833NS | Aliphatic monomer | 6 | 3 | — |
| TMCHMA | Cycloaliphatic monomer | 7.51 | 7.1 | 8.98 |
| Sartomer SR 340 | Aromatic monomer | — | 7.2 | 5.9 |
| Sartomer SR 339 | Aromatic monomer | — | 7.2 | 5.9 |
| PEG DMA 200 | Aliphatic oligomer | 14 | — | — |
| FLEX III BULK | Aromatic oligomer | 41.28 | 47 | 46 |
| PREMIX-1 | Stabilizer | 0.26 | 0.3 | 0.26 |
| PREMIX-2 | Stabilizer | 0.68 | 0.88 | 0.68 |
| PREMIX-3 | Stabilizer | 0.68 | 0.88 | 0.68 |
| PREMIX-4 | Stabilizer | 1.04 | 1.04 | 1.04 |
| Saccharin | Accelerator | 0.78 | 0.8 | 0.78 |
| 1-Acetyl-2-phenylhydrazine | Accelerator | 0.80 | 0.82 | 0.8 |
| Acrylic acid | Adhesion promoter | 1.04 | 1.04 | 1.35 |
| Ebecryl 168 | Adhesion promoter | 0.10 | 0.1 | 0.1 |
| PREMIX-5 | Adhesion promoter | 1.04 | 1.05 | 1.04 |
| Polyethylene powder | Filler | 8 | 6 | 6.7 |
| Solvent Red 24 | Additive | 0.02 | 0.02 | 0.02 |
| Cumene hydroperoxide (CHP) | Initiators | 1.57 | 1.57 | 1.57 |
| CAB 551-0.2 | Viscosity modifiers | 5 | 3.4 | 1.3 |
| Aerosil R 200 | Viscosity modifiers | 3 | 2.2 | 3.4 |

Tensile strength is determined by first curing a sample of the composition as a thin sheet for 24 hours at room temperature, then at 66° C. (150° F.) for a further another 24 hours, and finally then at 88° C. (190° F.) for 4 hours. Dumbbell shaped specimens of cured composition sealant are then cut using ASTM die "D", and the dimensions of the dumbbell shaped specimen are determined. The specimen is then placed in a conventional Dillon tensile testing apparatus having jaws which grip it at its wider end portions, and the specimen is stretched at a cross-head speed of 10 inches per minute until rupture. The tensile strength is the force at rupture divided by the initial cross sectional area of the narrow portion of the specimen.

Elongation is determined by a procedure identical to that for tensile strength. The elongation, expressed as a percentage, is calculated by subtracting the initial length of the specimen from its length at rupture, multiplying by 100, dividing by the initial length, and then—if necessary—by multiplying the result by a correction factor which compensates for any material which may have been pulled out of the jaws gripping each end of the specimen. The initial and final rupture lengths are determined by measuring the distances between the jaws. Thus the specimen being elongated includes not only the narrow, central portion but also some of the wider end portions of the specimen.

TABLE 2

| Property | Comparative Example 1 | Example 1 | Example 2 |
|---|---|---|---|
| Elongation (%) | 25 | 132 | 212 |
| Viscosity (mPa · s) | 13500 | 11400 | 9300 |

In view of the foregoing description and examples, it will be apparent to those skilled in the art that equivalent modifications thereof can be made without departing from the scope of the claims.

What is claimed is:

1. One component (1K) anaerobic curable composition comprising, based on the weight of the composition:
   from 15 to 35 wt. % of a1) at least one (meth)acrylate monomer represented by Formula I:

$$H_2C=CGCO_2R^1 \qquad (I)$$

wherein: G is hydrogen, halogen or a $C_1$-$C_4$ alkyl group; and,
   $R^1$ is selected from $C_1$-$C_{30}$ alkyl, $C_3$-$C_{30}$ cycloalkyl, $C_2$-$C_{20}$ alkenyl and $C_2$-$C_{12}$ alkynyl;
   from 5 to 25 wt. % of a2) at least one (meth)acrylate monomer represented by Formula II:

$$H_2C=CQCO_2R^2 \qquad (II)$$

wherein: Q may be hydrogen, halogen or a $C_1$-$C_4$ alkyl group; and,
   $R^2$ may be selected from $C_6$-$C_{18}$ aryl, alkaryl and aralkyl;
   from 35 to 75 wt. % of a3) at least one (meth)acrylate-functionalized oligomer;
   from 0.1 to 10 wt. % of b) at least one cure initiator;
   from 0.1 to 5 wt. % of c) at least one cure accelerator;
   from 1 to 5 wt. % of d) at least one cellulose mixed ester of which all of said ester groups are selected from $C_1$-$C_6$ ester groups; and, from 1 to 5 wt. % of e) fumed silica.

2. The one component composition according to claim 1, wherein $R^1$ in Formula I is selected from $C_1$-$C_{18}$ alkyl and $C_3$-$C_{18}$ cycloalkyl.

3. The one component composition according to claim 1 comprising from 15 to 30 wt. %, based on the weight of the composition, of a1) said at least one (meth)acrylate monomer represented by Formula I.

4. The one component composition according to claim 1, wherein said at least one (meth)acrylate monomer represented by Formula II is selected from: benzyl (meth)acrylate; phenoxyethyl (meth)acrylate; phenoxydiethylene glycol (meth)acrylate; phenoxypropyl (meth)acrylate; and, phenoxydipropylene glycol (meth)acrylate.

5. The one component composition according to claim 1 comprising from 5 to 20 wt. %, based on the weight of the composition, of a2) said at least one (meth)acrylate monomer represented by Formula II.

6. The one component composition according to claim 1, wherein said at least one (meth)acrylate functionalized oligomer is characterized by having: i) two or more (meth)acrylate functional groups per molecule; and/or, ii) a weight average molecular weight (Mw) of from 300 to 1000 daltons.

7. The one component composition according to claim 1, wherein said at least one (meth)acrylate functionalized oligomer is selected from: (meth)acrylate-functionalized urethane oligomers; (meth)acrylate-functionalized polyepoxide resins; (meth)acrylate-functionalized polybutadienes; (meth)acrylic polyol (meth)acrylates; polyester (meth)acrylate oligomers; polyamide (meth)acrylate oligomers; and, polyether (meth)acrylate oligomers.

8. The one component composition according to claim 7 comprising at least one polyether (meth)acrylate oligomer.

9. The one component composition according to claim 1 comprising from 40 to 60 wt. %, based on the weight of the composition, of a3) said at least one (meth)acrylate-functionalized oligomer.

10. The one component composition according to claim 1, wherein at least one cure initiator is selected from the group consisting of: cumene hydroperoxide (CHP); para-menthane hydroperoxide; t-butyl hydroperoxide (TBH); t-butyl perbenzoate; t-amyl hydroperoxide; 1,2,3,4-tetramethylbutyl hydroperoxide; benzoyl peroxide; dibenzoyl peroxide; 1,3-bis(t-butylperoxyisopropyl) benzene; diacetyl peroxide; butyl 4,4-bis (t-butylperoxy) valerate; p-chlorobenzoyl peroxide; t-butyl cumyl peroxide; di-t-butyl peroxide; dicumyl peroxide; 2,5-dimethyl-2,5-di-t-butylperoxyhexane; 2,5-dimethyl-2,5-di-t-butyl-peroxyhex-3-yne; and, 4-methyl-2,2-di-t-butylperoxypentane.

11. The one component composition according to claim 1 comprising from 0.1 to 5 wt. % of b) said at least one cure initiator, based on the total weight of the composition.

12. The one component composition according to claim 1, wherein all of said ester groups of said at least one cellulose mixed ester are selected from $C_1$-$C_4$ ester groups.

13. The one component composition according to claim 1, wherein said at least one cellulose mixed ester has a glass transition temperature ($T_g$) of from 80° C. to 160° C., as measured by differential scanning calorimetry (DSC).

14. The one component composition according to claim 1, wherein said fumed silica is characterized by at least one of: i) an average particle size of from 1 to 10 microns; ii) a specific surface area of from 100 to 250 $m^2$/g; and, iii) a tap density of from 25 to 75 g/l.

15. The one component composition according to claim 1, wherein the ratio by weight of fumed silica to said cellulose ester is in the range from 3:1 to 1:3.

16. The one component composition according to claim 1, wherein said composition:
   i) is essentially free of solvent; and,
   ii) has a viscosity of from 3000 to 20000 mPa·s, as determined at 20° C. and 50% Relative Humidity (RH).

17. A cured product obtained from the one-component (1K) composition as defined in claim 1.

* * * * *